(12) United States Patent
Zhao et al.

(10) Patent No.: US 12,108,365 B2
(45) Date of Patent: Oct. 1, 2024

(54) METHOD PERFORMED BY USER EQUIPMENT, AND USER EQUIPMENT

(71) Applicant: SHARP KABUSHIKI KAISHA, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 320 days.

(21) Appl. No.: 17/617,914

(22) PCT Filed: Jun. 18, 2020

(86) PCT No.: PCT/CN2020/096790
§ 371 (c)(1),
(2) Date: Dec. 9, 2021

(87) PCT Pub. No.: WO2020/253770
PCT Pub. Date: Dec. 24, 2020

(65) Prior Publication Data
US 2022/0312388 A1    Sep. 29, 2022

(30) Foreign Application Priority Data

Jun. 19, 2019  (CN) .......................... 201910535303.6

(51) Int. Cl.
*H04W 72/02*   (2009.01)
*H04W 72/0446*  (2023.01)
*H04W 72/1263*  (2023.01)
*H04W 72/20*   (2023.01)

(52) U.S. Cl.
CPC ....... *H04W 72/02* (2013.01); *H04W 72/0446* (2013.01); *H04W 72/1263* (2013.01); *H04W 72/20* (2023.01)

(58) Field of Classification Search
CPC .......................... H04W 72/02; H04W 72/0446
USPC ........................................................ 370/329
See application file for complete search history.

(56) References Cited

U.S. PATENT DOCUMENTS

2019/0044667 A1    2/2019  Guo et al.
2021/0058907 A1*   2/2021  Fakoorian ............. H04W 76/14
2021/0321396 A1*  10/2021  Li ......................... H04L 1/1896

OTHER PUBLICATIONS

MCC Support: "Final Report of 3GPP TSG RAN WG1 #96b v1.0.0 (Xi'an, China, Apr. 8-12, 2019)", R1-1905921, 3GPP TSG RAN WG1 Meeting #97, Reno, USA, May 13-17, 2019.
MCC Support: "Final Report of 3GPP TSG RAN WG1 #AH_1901 v1.0.0 (Taipei, Taiwan, Jan. 21-25, 2019)", R1-1901483, 3GPP TSG RAN WG1 Meeting #96, Athens, Greece, Feb. 25-Mar. 1, 2019.

(Continued)

*Primary Examiner* — Sibte H Bukhari
(74) *Attorney, Agent, or Firm* — ScienBiziP, P.C.

(57) ABSTRACT

The present disclosure provides a method performed by user equipment and user equipment. The method includes: receiving sidelink configuration information; receiving sidelink control information (SCI) transmitted by other user equipment and a corresponding physical sidelink shared channel (PSSCH); determining a transmission slot S of a physical sidelink feedback channel (PSFCH) corresponding to the PSSCH; and determining N sidelink slots associated with the slot S, where N is a positive integer.

3 Claims, 5 Drawing Sheets

(56) References Cited

OTHER PUBLICATIONS

MCC Support: "Final Report of 3GPP TSG RAN WG1 #95 v1.0.0 (Spokane, USA, Nov. 12-18, 2018)", R1-1901482, 3GPP TSG RAN WG1 Meeting #96, Athens, Greece, Feb. 25-Mar. 1, 2019.
MCC Support: "Final Report of 3GPP TSG RAN WG1 #94bis v1.1.0 (Chengdu, China, Oct. 8-12, 2018)", R1-1813901, 3GPP TSG RAN WG1 Meeting #95, Spokane, USA, Nov. 12-16, 2018.
Vodafone: "New SID: Study on NR V2X", RP-181429(RP-181480), 3GPP TSG RAN Meeting #80, La Jolla, USA, Jun. 11-14, 2018.
Huawei, CATT, LG Electronics, HiSilicon, China Unicom: "New WID on 3GPP V2X Phase 2", RP-170798, 3GPP TSG RAN Meeting #75, Dubrovnik, Croatia, Mar. 6-9, 2017.
LG Electronics, Huawei, HiSilicon, CATT, CATR: "New WI proposal: Support for V2V services based on LTE sidelink", RP-152293, 3GPP TSG RAN Meeting #70, Sitges, Spain, Dec. 7-10, 2015.
Qualcomm Incorporated: "Work Item Proposal for Enhanced LTE Device to Device Proximity Services", RP-142311, 3GPP TSG RAN Meeting #66, Maui, USA, Dec. 8-11, 2014.
Qualcomm Incorporated: "Work item proposal on LTE Device to Device Proximity Services", RP-140518, 3GPP TSG RAN Meeting #63, Fukuoka, Japan, Mar. 3-6, 2014.
ZTE, Sanechips: "NR sidelink physical layer structure", R1-1906457, 3GPP TSG RAN WG1 #97, Reno, USA, May 13-17, 2019.

\* cited by examiner

METHOD PERFORMED BY USER EQUIPMENT, AND USER EQUIPMENT

TECHNICAL FIELD

The present disclosure relates to the technical field of wireless communications, and in particular to a method performed by user equipment, a method performed by a base station, and corresponding user equipment.

BACKGROUND

In conventional cellular networks, all communication needs to be forwarded via base stations. By contrast, D2D communication (device-to-device communication, device-to-device direct communication) refers to a direct communication method between two pieces of user equipment without forwarding via a base station or a core network. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and intends to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., a vehicle communicates with road infrastructure.

3GPP divides the research and standardization of V2X into three stages. The first stage was completed in September 2016, and was mainly focused on V2V and based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly intended to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of sub-channels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018. The research plan of this project include research goals that support sidelink unicast, sidelink groupcast, and sidelink broadcast.

According to the conclusions of the 3GPP RAN1 #94bis meeting in October 2018 (see Non-Patent Document 6), for unicast and groupcast of sidelink communication, it is determined that HARQ feedback and HARQ combining are supported at a physical layer.

In the conclusions of the 3GPP RAN1 #95 meeting in November 2018 (see Non-Patent Document 7), a physical sidelink feedback channel (PSFCH) was introduced to carry HARQ feedback information such as HARQ ACK or HARQ NACK in the sidelink communication.

At the 3GPP RAN1 AH #1901 meeting in January 2019 (see Non-Patent Document 8), the following conclusions concerning the design of an HARQ feedback mechanism for NR V2X groupcast were arrived at: for groupcast communication, when HARQ feedback is enabled, two HARQ feedback mechanisms are supported, and are as follows:
1) receiving UE feeds back only the HARQ NACK; if the receiving UE decodes a PSCCH correctly but fails to decode a corresponding PSSCH correctly, then the receiving UE feeds back the NACK; otherwise, the receiving UE does not perform HARQ feedback;
a) all receiving UE in a group share one PSFCH resource to feed back the HARQ NACK.
2) The receiving UE feeds back the HARQ ACK and the HARQ NACK; if the receiving UE decodes the PSCCH correctly but fails to decode the corresponding PSSCH correctly, then the receiving UE feeds back the NACK; if the receiving UE decodes the PSCCH correctly and decodes the corresponding PSSCH correctly, then the receiving UE feeds back the ACK.
a) Each UE in the group uses a separate PSFCH resource to feed back the HARQ ACK and the HARQ NACK.

In the conclusion of the 3GPP RAN1 #96bis meeting in April 2019 (see Non-Patent Document 9), the following conclusions concerning PSFCH resource configuration were arrived at:
in a resource pool, PSFCHs are periodically configured in slots of the resource pool, and the period can be denoted as N, where the value of N may be 1, or 2, or 4.

Solutions of this patent include a method in which sidelink UE determines a PSFCH resource for feedback of a feedback sidelink HARQ.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2
Non-Patent Document 5: RP-181480, New SID Proposal: Study on NR V2X
Non-Patent Document 6: RAN1 #94bis, Chairman notes, section 7.2.4.2
Non-Patent Document 7: RAN1 #95, Chairman notes, section 7.2.4.2
Non-Patent Document 8: RAN1 AH #1901, Chairman notes, section 7.2.4.1.4, section 7.2.4.3
Non-Patent Document 9: RAN1 #96bis, Chairman notes, section 7.2.4.5

SUMMARY OF INVENTION

In order to address at least a part of the aforementioned issues, the present disclosure provides a method performed by user equipment and user equipment, which are effectively applicable to application scenarios of V2X based on 5G NR network technology.

According to an aspect of the present disclosure, a method performed by user equipment is provided, and comprises: receiving sidelink configuration information, i.e., first configuration information; receiving sidelink control information (SCI) transmitted by other user equipment and a corresponding physical sidelink shared channel (PSSCH); determining a transmission slot S of a physical sidelink feedback channel (PSFCH) corresponding to the PSSCH; and determining N sidelink slots associated with the slot S, where N is a positive integer.

In the method performed by user equipment according to an aspect of the present disclosure, the first configuration information is configuration information transmitted by a base station via radio resource control (RRC) signaling; or the first configuration information is comprised in pre-configuration information of the user equipment, and the first configuration information comprises resource pool configuration information, i.e., second configuration information.

In the method performed by user equipment according to an aspect of the present disclosure, the second configuration information comprises: the period of the PSFCH, i.e., N; and/or a feedback interval K, where K is a positive integer.

In the method performed by user equipment according to an aspect of the present disclosure, the user equipment determines a transmission slot S of the PSFCH corresponding to the PSSCH, so that an interval between the PSFCH and the PSSCH is the smallest integer greater than or equal to the feedback interval K and the slot S comprises a PSFCH resource.

In the method performed by user equipment according to an aspect of the present disclosure, the user equipment determines, according to the period N, N sidelink slots associated with the slot S.

The method performed by user equipment according to an aspect of the present disclosure does not further comprise: determining, by the user equipment, that a slot in which the PSSCH is located is the (i+1)th slot of the N sidelink slots, where i=0, 1, . . . , N−1, used to determine resources of the PSFCH.

In addition, according to another aspect of the present disclosure, user equipment is further provided, and comprises: a processor; and a memory storing instructions, wherein the instructions, when run by the processor, perform the above method.

Effect of Invention

According to the present disclosure, a method performed by user equipment and user equipment effectively applicable to application scenarios of V2X based on 5G NR network technology are provided.

BRIEF DESCRIPTION OF THE DRAWINGS

The above and other features of the present disclosure will become more apparent with the following detailed description in conjunction with the accompanying drawings.

DETAILED DESCRIPTION

Figure 1:
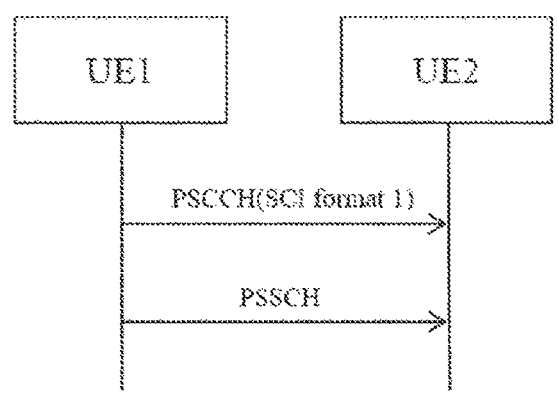
FIG. 1 is a basic procedure diagram schematically showing Rel-14/15 LTE V2X sidelink communication.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

A plurality of embodiments according to the present disclosure are described in detail below by using a 5G mobile communication system and its subsequent evolved versions as an exemplary application environment. However, it is to be noted that the present invention is not limited to the following embodiments, and rather, it is applicable to many other wireless communication systems, such as a communication system later than 5G and a 4G mobile communication system earlier than the 5G.

Some terms related to the present disclosure are described below. Unless otherwise specified, the terms related to the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB 1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel The following is a description of the prior art associated with the solutions of the present disclosure. Unless otherwise specified, the same terms in the specific embodiments have the same meanings as in the prior art.

It is worth pointing out that the V2X and sidelink mentioned in the description of the present disclosure have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present disclosure can be replaced equivalently.

The description of the present disclosure relates to a sequence-based PSFCH. It is worth pointing out that the design of the PSFCH includes sequence-based design, but is not limited thereto.

The same symbols in the description of the present disclosure always have the same meaning, such as the meaning of a period N used in PSFCH resource configuration, the meaning of the number $N_{PRB}^{PSFCH}$, of PRBs occupied by the PSFCH in the frequency domain, the meaning of i determined by the UE, and so on.

Sidelink Communication Scenario
1) Out-of-coverage sidelink communication: Both pieces of UE performing sidelink communication are out of network coverage (for example, the UE cannot detect any cell that meets a "cell selection criterion" on a frequency at which sidelink communication needs to be performed, and that means the UE is out of network coverage).
2) In-coverage sidelink communication: Both pieces of UE performing sidelink communication are in network coverage (for example, the UE detects at least one cell that meets a "cell selection criterion" on a frequency at which sidelink communication needs to be performed, and that means the UE is in network coverage).
3) Partial-coverage sidelink communication: One of two pieces of UE performing sidelink communication is out of network coverage, and the other is in network coverage.

From the perspective of a UE side, the UE has only two scenarios, out-of-coverage and in-coverage. Partial-coverage is described from the perspective of sidelink communication.

NR V2X Unicast, Groupcast, and Broadcast

Existing LTE V2X communication only supports broadcast communication at a physical layer. Broadcast communication is widely applied in scenarios such as cellular communication where a base station transmits a system message to UE in a cell. The design goals of NR V2X include support for unicast communication and groupcast communication at a physical layer. Unicast communication refers to communication between transmitting user equipment (UE) and single receiving user equipment. Groupcast communication generally means that a group of UE are assigned the same identity (ID), among which UE transmits V2X data to other UE in the group, and receives V2X data transmitted by other UE in the group.

HARQ and Sidelink HARQ

In order to better improve the reliability of transmission and improve the spectrum efficiency, an HARQ retransmission mechanism is usually included in unicast communication and groupcast communication. HARQ stands for hybrid automatic repeat request, which can provide an error correction function and implement fast repeat request, and is widely applied in wireless data communications. HARQ feedback includes an HARQ ACK (this feedback information means that reception and decoding are correct) and an HARQ NACK (this feedback information means that reception and decoding are not correct). Among them, the HARQ ACK means that receiving UE correctly receives and decodes data of transmitting UE and therefore feeds back an HARQ ACK; the HARQ NACK means that the receiving UE does not correctly receive and decode the data of the transmitting UE. When the receiving UE feeds back an HARQ NACK, the transmitting UE may retransmit corresponding data to ensure improvement in the reliability of data communication.

In NR V2X, HARQ feedback (or referred to as HARQ-ACK) and HARQ combining at a physical layer are supported. The HARQ ACK and the HARQ NACK are carried by a physical sidelink feedback channel (PSFCH).

Sidelink Groupcast HARQ

For groupcast sidelink communication, when HARQ feedback is enabled, two HARQ feedback mechanisms are supported, and are as follows:

1) the receiving UE feeds back only the HARQ NACK; if the receiving UE decodes a PSCCH correctly but fails to decode a corresponding PSSCH correctly, then the receiving UE feeds back the NACK; otherwise, the receiving UE does not perform HARQ feedback;
    a) all receiving UE in a group share one PSFCH resource to feed back the HARQ NACK.
2) The receiving UE feeds back the HARQ ACK and the HARQ NACK; if the receiving UE decodes the PSCCH correctly but fails to decode the corresponding PSSCH correctly, then the receiving UE feeds back the NACK; if the receiving UE decodes the PSCCH correctly and decodes the corresponding PSSCH correctly, then the receiving UE feeds back the ACK.
    a) Each UE in the group uses a separate PSFCH resource to feed back the HARQ ACK and the HARQ NACK.

A PSFCH resource represents a PSFCH resource mapped to a specific time domain, a specific frequency domain, and a specific code domain.

PSFCH Resource Configuration

In a resource pool, PSFCHs are periodically configured in slots of the resource pool, and the period can be denoted as N, where the value of N may be 1, or 2, or 4. For example, N=1 means that each of the slots configured in the resource pool includes a PSFCH resource. N=2 means that every 2 consecutive slots of all of the slots configured in the resource pool include a slot including a PSFCH resource. N=4 means that every 4 consecutive slots of all of the slots configured in the resource pool include a slot including a PSFCH resource.

Method for the UE to Determine a PSFCH Time Domain Resource

According to the configuration of the PSFCH resource, the UE acquires a configuration period N of the PSFCH on the slots of the resource pool. If HARQ feedback is enabled, then the UE can determine that all PSFCHs carrying HARQ feedback information and corresponding to PSSCHs received on N certain consecutive slots (respective numbers of these N consecutive slots are denoted by i, and the range of i is 0, 1, . . . , N−1) of the resource pool are on the same slot s configured with a PSFCH resource. In the description of the present disclosure, N consecutive slots corresponding to the slot s are used to represent these N consecutive slots, and the UE may determine the value of i according to that a slot in which the PSSCH is received is the (i+1)th slot of the N consecutive slots corresponding to the slot s. Here, K represents a time-domain interval from reception of the PSSCH to reception of the corresponding PSFCH, where optionally, the unit of K is slot. For example, N=4, K=3, and N=4 consecutive slots corresponding to the slot s mean that a certain slot of the resource pool including a PSFCH is denoted as $slot_{PSFCH}$, where all of the slots of the resource pool are numbered as $slot_0$, $slot_1$, . . . ; in this case, these N=4 consecutive slots are $slot_{PSFCH-6}$ to $slot_{PSFCH-3}$, and this means that all PSFCHs corresponding to PSSCHs received by the UE on $slot_{PSFCH-6}$ to $slot_{PSFCH-3}$ are on $slot_{PSFCH}$. For example, if the UE receives a PSSCH on $slot_{PSFCH-4}$, then $slot_{PSFCH}$ corresponds to the (2+1)th slot of the 4 slots, and therefore i=2.

Sequence-Based PSFCH

Here, $N_{PRB}^{PSFCH}$ is used to represent the number of PRBs occupied by the PSFCH in the frequency domain, and a sequence length of the PSFCH is therefore denoted as $N_{PRB}^{PSFCH} \times N_{sc}^{RB}$, where $N_{sc}^{RB}=12$. This sequence can be expressed as $r^{\alpha}(n)=e^{j\alpha n} \times r(n)$, where n=0, 1, 2, . . . , $N_{PRB}^{PSFCH} \times N_{sc}^{RB}-1$. $\alpha$ represents a cyclic shift of the sequence. Different cyclic shifts may generate different sequences (having the same sequence length), that is, different cyclic shifts represent different PSFCH resources. Specifically, if respective time domain resources and frequency domain resources of two PSFCHs are the same, and if respective cyclic shifts $\alpha$ of the PSFCHs are different (code domain resources are different), then the two PSFCHs represent two different PSFCH resources. On a certain designated (or determined) time-frequency resource, when an initial sequence is designated (or determined) to be an initial sequence r(n), the number of possible values of $\alpha$ is $N_{PRB}^{PSFCH} \times N_{sc}^{RB}$. That is, $r^{\alpha}(n)$ may generate $N_{PRB}^{PSFCH} \times N_{sc}^{RB}$ sequences at most. That is, at most $N_{PRB}^{PSFCH} \times R_{sc}^{RB}$ different PSFCH resources exist on the designated (or determined) time-frequency resource.

For example, $N_{PRB}^{PSFCH}=1$, and the length of the sequence is $N_{PRB}^{PSFCH} \times N_{sc}^{RB}=12$. Therefore, when a certain time-frequency resource is designated, the number of possible values of $\alpha$ is $N_{PRB}^{PSFCH} \times N_{sc}^{RB}=12$, that is, 12 different PSFCH resources exist. If the UE needs to feed back 1-bit HARQ feedback information, then the UE needs to occupy 2 different PSFCH resources to respectively transmit the HARQ ACK and the HARQ NACK. At most 12/2=6 different pieces of user equipment can be multiplexed on the designated time-frequency resource for HARQ feedback (each UE feeds back 1-bit HARQ information). Alternatively, similarly, if the UE needs to feed back 2-bit HARQ feedback information, then the UE needs to occupy $2^2=4$ different PSFCH resources to respectively transmit the HARQ ACK and the HARQ NACK of each bit of HARQ feedback information. At most 12/4=3 different pieces of user equipment can be multiplexed on the designated time-frequency resource for HARQ feedback.

It is worth pointing out that regarding respective numbers of the PSFCH resources according to Embodiment 1 to Embodiment 12 of the present disclosure, optionally, the numbering meets a cyclic shift priority criterion. For example, on a PSFCH occasion on a certain time-frequency resource (on one OFDM symbol and $N_{PRB}^{PSFCH}$ consecutive PRBs), respective numbers of PSFCH resources are k, k+1, . . . , $k+N_{PRB}^{PSFCH} \times 12-1$. Each PSFCH resource corresponds to a cyclic shift, and a difference between cyclic shifts of PSFCH resources having adjacent resource numbers is 1. On the same OFDM symbol, respective numbers of PSFCH resources corresponding to a next PSFCH occasion in the frequency domain (in an increasing order of PRB numbers) are $k+N_{PRB}^{PSFCH} \times 12$, $k+N_{PRB}^{PSFCH} \times 12+1$, . . . , $k+N_{PRB}^{PSFCH} \times 12 \times 2-13$, and so on. Optionally, if at least one OFDM symbol in a certain slot s includes a PSFCH occasion, then, optionally, the numbering of the PSFCH resources is based on the above method and is performed according to an increasing order of OFDM symbol numbers. For example, PSFCH resources on an OFDM symbol 12 are firstly numbered, and then PSFCH resources on an OFDM symbol 13 are numbered, that is, respective numbers of the PSFCH resources on the OFDM symbol 13 are in increasing order relative to respective numbers of the PSFCH resources on the OFDM symbol 12.

Terminologies in the Embodiments of the Description

Unless otherwise specified, definitions and determination methods for the terminologies in all embodiments of the description are the same as definitions and determination methods for the following terminologies.

Intra-group identifier of the UE in groupcast: in the embodiments of the present disclosure, the intra-group identifier of the UE in groupcast is represented by m. Optionally, an optional method for the user equipment (the transmitting UE, or the receiving UE, or the transmitting UE and the receiving UE) in groupcast to determine m is to arrange all layer-2 IDs (optionally, the layer-2 ID is 24-bit) of all of (or part of) pieces of UE in a group in an ascending order or in a descending order, where the identifier m in the group represents the corresponding (m+1)th (or mth) UE in the above arrangement. Alternatively, another optional method is to arrange all layer-1 IDs (optionally, the layer-1 ID is 8-bit or 16-bit or 24-bit) of all of (or part of) the pieces of UE in the group in an ascending order or in a descending order, where the identifier m in the group represents the corresponding (m+1)th (or mth) UE in the above arrangement. The method for determining the intra-group identifier of the UE in the present disclosure includes but is not limited to the above method.

N consecutive slots corresponding to a PSFCH on a certain slot: according to the configuration of the PSFCH resource, the UE acquires a configuration period N of the PSFCH on the slots of the resource pool. If HARQ feedback is enabled, then the UE can determine that all PSFCHs carrying HARQ feedback information and corresponding to PSSCHs received on N certain consecutive slots (respective numbers of these N consecutive slots are denoted by i, and the range of i is 0, 1, . . . , N−1) of the resource pool are on the same slot s configured with a PSFCH resource. In the description of the present disclosure, N consecutive slots corresponding to the slot s are used to represent these N consecutive slots, and the UE may determine the value of i according to that a slot in which the PSSCH is received is the (i+1)th slot of the N consecutive slots corresponding to the slot s.

PSFCH occasion: the PSFCH occasion represents all PSFCHs on a specific time domain resource (optionally, 1 OFDM symbol) and on a specific frequency domain resource (optionally, $N_{PRB}^{PSFCH}$ PRBs). The PSFCH occupies $N_{PRB}^{PSFCH}$ consecutive PRBs in the frequency domain and one OFDM symbol in the time domain.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. The SCI format 1 includes scheduling information of a PSSCH, such as frequency domain resources and the like of the PSSCH. Secondly, the UE1 transmits to the UE2 sidelink data, which is carried by a physical layer channel PSSCH. The PSCCH and the corresponding PSSCH are frequency division multiplexed, that is, the PSCCH and the corresponding PSSCH are located in the same subframe in the time domain and are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value 510. The PSCCH may carry the SCI format 1, where the SCI format 1 at least includes frequency domain resource information of the PSSCH. For example, for a frequency domain resource indication field, the SCI format 1 indicates a starting sub-channel number and the number of consecutive sub-channels of the PSSCH corresponding to the PSCCH.

2) The PSSCH occupies one subframe in the time domain, and uses frequency division multiplexing (FDM) with the corresponding PSCCH. The PSSCH occupies one or a plurality of consecutive sub-channels in the frequency domain. The sub-channel represents $n_{subCHsize}$ consecutive PRBs in the frequency domain. $n_{subCHsize}$ is configured by an RRC parameter, and a starting sub-channel and the number of consecutive sub-channels are indicated by the frequency domain resource indication field of the SCI format 1.

Resource Allocation Mode (Transmission Mode 3/4) of LTE V2X

Figure 2:
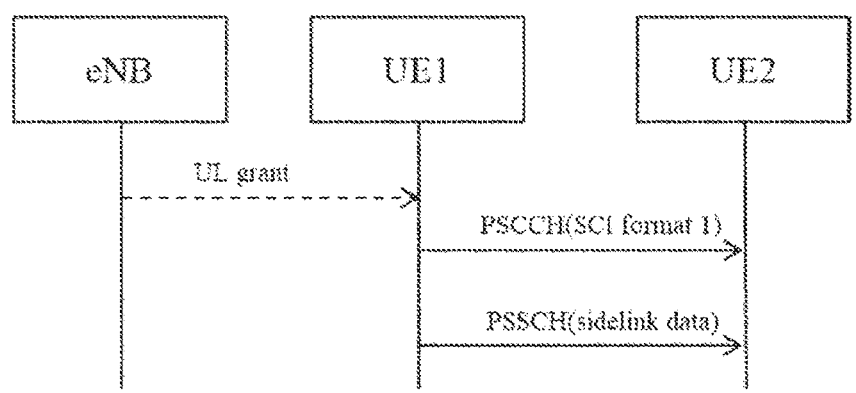
FIG. 2 schematically shows two resource allocation modes for Rel-14/15 LTE V2X.

FIG. 2 shows two resource allocation modes of LTE V2X, which are referred to as base station scheduling-based resource allocation (Transmission Mode 3) and UE sensing-based resource allocation (Transmission Mode 4), respectively. In LTE V2X, in eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (Transmission Mode 3): the base station scheduling-based resource allocation mode means that frequency domain resources used in sidelink communication are from scheduling of the base station. Transmission Mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For SPS, the base station configures one or a plurality of (at most 8) configured grants through IE: SPS-ConfigSL-r14, and each configured grant includes a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based transmission mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in Transmission Mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (Transmission Mode 4): the UE sensing-based resource allocation mode means that resources for sidelink communication are based on a procedure of sensing of a candidate available resource set performed by the UE. When the RRC signaling SL-V2X-ConfigDedicated is set to ue-Selected-r14, it indicates that the UE is configured in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

NR Numerology

NR supports five sub-carrier spacings, which are respectively 15 kHz, 30 kHz, 60 kHz, 120 kHz, and 240 kHz (corresponding to µ=0, 1, 2, 3, 4), as shown in table 4.2-1.

TABLE 4.2-1

| supported transmission numerologies | | |
|---|---|---|
| µ | $\Delta f = 2^\mu \cdot 15$ [kHz] | Cyclic Prefix (CP) |
| 0 | 15 | Normal |
| 1 | 30 | Normal |
| 2 | 60 | Normal, Extended |
| 3 | 120 | Normal |
| 4 | 240 | Normal |

Only when µ=2, that is, in the case of a 60-kHz sub-carrier spacing, an extended CP is supported, and only a normal CP is supported in the case of other sub-carrier spacings. For a normal CP, each slot includes 14 OFDM symbols, that is $N_{symbol}^{slot}=14$. For an extended CP each slot includes 12 OFDM symbols, that is, $N_{symbol}^{slot}=12$. For µ=0, i.e., the sub-carrier spacing of 15 kHz, 1 slot=1 ms; for µ=1, i.e., the sub-carrier spacing of 30 kHz, 1 slot=0.5 ms; for µ=2, i.e., the sub-carrier spacing of 60 kHz, 1 slot=0.25 ms; and so on. The definition $N_{symbol}^{slot}$ provided herein is used in the embodiments of the description of the present disclosure.

Figure 3:
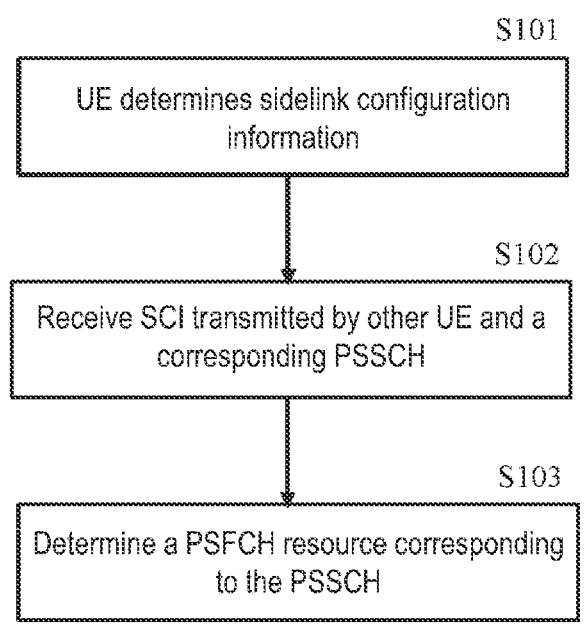
FIG. 3 is a basic flowchart schematically showing a method performed by user equipment according to Embodiments 1 to 12 of the present disclosure.

FIG. 3 is a basic flowchart showing a method performed by user equipment according to Embodiments 1 to 12 of the present disclosure.

The method performed by user equipment according to Embodiments 1 to 12 of the present disclosure is described in detail below in conjunction with the basic flowchart shown in FIG. 3.

Embodiment 1

As shown in FIG. 3, in Embodiment 1 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes a feedback interval K (an interval from a PSSCH to a corresponding PSFCH). Optionally, K is in units of slots.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are unicast transmission. Implementation of the indication information includes but is not limited to the following:

Optionally, the SCI includes 2-bit indication field indication information or 1-bit indication field indication information, and indicates that the SCI and the corresponding PSSCH are unicast transmission.

Optionally, the SCI includes an ID of the other user equipment and/or an ID of the user equipment and/or the transmitted session (or link) ID, and indicates that the SCI and the corresponding PSSCH are unicast transmission.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N-1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n-1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ ACK is $Index_{startSubchannel} \times (2 \text{ or } 12n) + i \times N_{subchannel} \times (2 \text{ or } 12n)$, and the user equipment determines that the number of a PSFCH resource for feeding back an HARQ NACK is $Index_{startSubchannel} \times (2 \text{ or } 12n) + i \times N_{subchannel} \times (2 \text{ or } 12n) + 1$; alternatively, optionally, the user equipment determines that the number of the PSFCH resource for feeding back the HARQ NACK is $Index_{startSubchannel} \times (2 \text{ or } 12n) + i \times N_{subchannel} \times (2 \text{ or } 12n) + 12n/2$. Alternatively, optionally, the user equipment determines that the number of the PSFCH resource for feeding back the HARQ NACK is $Index_{startSubchannel} \times (2 \text{ or } 12n) + i \times N_{subchannel} \times (2 \text{ or } 12n)$; optionally, the user equipment determines that the number of the PSFCH resource for feeding back the HARQ ACK is $Index_{startSubchannel} \times (2 \text{ or } 12n) + i \times N_{subchannel} \times (2 \text{ or } 12n) + 1$; alternatively, optionally, the user equipment determines that the number of the PSFCH resource for feeding back the HARQ ACK is $Index_{startSubchannel} \times (2 \text{ or } 12n) + i \times N_{subchannel} \times (2 \text{ or } 12n) + 12n/2$.

Alternatively, optionally, if the number of bits in HARQ feedback of the user equipment is 2, then optionally the user equipment determines that the number of a PSFCH resource for feeding back "00" is $Index_{startSubchannel} \times (4 \text{ or } 12n) + i \times N_{subchannel} \times (4 \text{ or } 12n)$; optionally, the user equipment determines that the number of a PSFCH resource for feeding back "01" is $Index_{startSubchannel} \times (4 \text{ or } 12n) + i \times N_{subchannel} \times (4 \text{ or } 12n) + 1$; alternatively, optionally, the user equipment determines that the number of the PSFCH resource for feeding back "01" is $Index_{startSubchannel} \times (4 \text{ or } 12n) + i \times N_{subchannel} \times (4 \text{ or } 12n) + 12n/4$; optionally, the user equipment determines that the number of a PSFCH resource for feeding back "11" is $Index_{startSubchannel} \times (4 \text{ or } 12n) + i \times N_{subchannel} \times (4 \text{ or } 12n) + 2$; alternatively, optionally, the user equipment determines that the number of the PSFCH resource for feeding back "11" is $Index_{startSubchannel} \times (4 \text{ or } 12n) + i \times N_{subchannel} \times (4 \text{ or } 12n) + 2 \times 12n/4$; optionally, the user equipment determines that the number of a PSFCH resource for feeding back "10" is $Index_{startSubchannel} \times (4 \text{ or } 12n) + i \times N_{subchannel} \times (4 \text{ or } 12n) + 3$; alternatively, optionally, the user equipment determines that the number of the PSFCH resource for feeding back "10" is $Index_{startSubchannel} \times (4 \text{ or } 12n) + i \times N_{subchannel} \times (4 \text{ or } 12n) + 3 \times 12n/4$. The numbers of the PSFCH resources corresponding to "00", "01", "11", and "10" include but are not limited to the foregoing embodiment.

Embodiment 2

As shown in FIG. 3, in Embodiment 2 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are unicast transmission. Implementation of the indication information includes but is not limited to the following:

Optionally, the SCI includes 2-bit indication field indication information or 1-bit indication field indication information, and indicates that the SCI and the corresponding PSSCH are unicast transmission.

Optionally, the SCI includes an ID of the other user equipment and/or an ID of the user equipment and/or the transmitted session (or link) ID, and indicates that the SCI and the corresponding PSSCH are unicast transmission.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ ACK is $Index_{startSubchannel} \times (2$ or $12n)+i \times$ PSFCHoccasion$\times 12n/N$; optionally, the user equipment determines that the number of a PSFCH resource for feeding back an HARQ NACK is $Index_{startSubchannel} \times (2$ or $12n)+i \times$ PSFCHoccasion$\times 12n/N+1$; alternatively, optionally, the user equipment determines that the number of the PSFCH resource for feeding back the HARQ NACK is $Index_{startSubchannel} \times (2$ or $12n)+i \times$PSFCHoccasion$\times 12n/N+12n/2$. Alternatively, optionally, the user equipment determines that the number of the PSFCH resource for feeding back the HARQ NACK is $Index_{startSubchannel} \times (2$ or $12n)+i \times$PSFCHoccasion$\times 12n/N$; optionally, the user equipment determines that the number of the PSFCH resource for feeding back the HARQ ACK is $Index_{startSubchannel} \times (2$ or $12n)+i \times$PSFCHoccasion$\times 12n/N+1$; alternatively, optionally, the user equipment determines that the number of the PSFCH resource for feeding back the HARQ ACK is $Index_{startSubchannel} \times (2$ or $12n)+i \times$PSFCHoccasion$\times 12n/N+12n/2$.

Alternatively, optionally, if the number of bits in HARQ feedback of the user equipment is 2, then optionally the user equipment determines that the number of a PSFCH resource for feeding back "00" is $Index_{startSubchannel} \times (4$ or $12n)+i \times$PSFCHoccasion$\times 12n/N$; optionally, the user equipment determines that the number of a PSFCH resource for feeding back "01" is $Index_{startSubchannel} \times (4$ or $12n)+i \times$PSFCHoccasion$\times 12n/N+1$; alternatively, optionally, the user equipment determines that the number of the PSFCH resource for feeding back "01" is $Index_{startSubchannel} \times (4$ or $12n)+i \times$PSFCHoccasion$\times 12n/N+12n/4$; optionally, the user equipment determines that the number of a PSFCH resource for feeding back "11" is $Index_{startSubchannel} \times (4$ or $12n)+i \times$PSFCHoccasion$\times 12n/N+2$; alternatively, optionally, the user equipment determines that the number of the PSFCH resource for feeding back "11" is $Index_{startSubchannel} \times (4$ or $12n)+i \times$PSFCHoccasion$\times 12n/N+(12n/4) \times 2$; optionally, the user equipment determines that the number of a PSFCH resource for feeding back "10" is $Index_{startSubchannel} \times (4$ or $12n)+i \times$PSFCHoccasion$\times 12n/N+3$; alternatively, optionally, the user equipment determines that the number of the PSFCH resource for feeding back "10" is $Index_{startSubchannel} \times (4$ or $12n)+i \times$PSFCHoccasion$\times 12n/N+(12n/4) \times 3$. The numbers of the PSFCH resources corresponding to "00", "01", "11", and "10" include but are not limited to the foregoing embodiment.

Embodiment 3

As shown in FIG. 3, in Embodiment 3 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that the sidelink communication in the resource pool is unicast.

In step S102, the user equipment receives sidelink control information (SCI) transmitted by other user equipment and a corresponding PSSCH.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ ACK is $Index_{startSubchannel} \times (2$ or $12n)+i \times N_{subchannel} \times (2$ or $12n)$, and the user equipment determines that the number of a PSFCH resource for feeding back an HARQ NACK is $Index_{startSubchannel} \times (2$ or $12n)+i \times N_{subchannel} \times (2$ or $12n)+1$; alternatively, optionally, the user equipment determines that the number of the PSFCH resource for feeding back the HARQ NACK is $Index_{startSubchannel} \times (2$ or $12n)+i \times N_{subchannel} \times (2$ or $12n)+12n/2$. Alternatively, optionally, the user equipment determines that the number of the PSFCH resource for feeding back the HARQ NACK is $Index_{startSubchannel} \times (2$ or $12n)+i \times N_{subchannel} \times (2$ or $12n)$; optionally, the user equipment determines that the number of the PSFCH resource for feeding back the HARQ ACK is $Index_{startSubchannel} \times (2$ or $12n)+i \times N_{subchannel} \times (2$ or $12n)+1$; alternatively, optionally, the user equipment determines that the number of the PSFCH resource for feeding back the HARQ ACK is $Index_{startSubchannel} \times (2$ or $12n)+i \times N_{subchannel} \times (2$ or $12n)+12n/2$.

Alternatively, optionally, if the number of bits in HARQ feedback of the user equipment is 2, then optionally the user equipment determines that the number of a PSFCH resource for feeding back "00" is $Index_{startSubchannel} \times (4$ or $12n)+i \times N_{subchannel} \times (4$ or $12n)$; optionally, the user equipment determines that the number of a PSFCH resource for feeding back "01" is $Index_{startSubchannel} \times (4$ or $12n)+i \times N_{subchannel} \times (4$ or $12n)+1$; alternatively, optionally, the user equipment determines that the number of the PSFCH resource for feeding back "01" is $Index_{startSubchannel} \times (4$ or $12n)+i \times N_{subchannel} \times (4$ or $12n)+12n/4$; optionally, the user equipment determines that the number of a PSFCH resource for feeding back "11" is $Index_{startSubchannel} \times (4$ or $12n)+i \times N_{subchannel} \times (4$ or $12n)+2$; alternatively, optionally, the user equipment determines that the number of the PSFCH resource for feeding back "11" is $Index_{startSubchannel} \times (4$ or $12n)+i \times N_{subchannel} \times (4$ or $12n)+2 \times 12n/4$; optionally, the user equipment determines that the number of a PSFCH resource for feeding back "10" is $Index_{startSubchannel} \times (4$ or $12n)+i \times N_{subchannel} \times (4$ or $12n)+3$; alternatively, optionally, the user equipment determines that the number of the PSFCH resource for feeding back "10" is $Index_{startSubchannel} \times (4$ or $12n)+i \times N_{subchannel} \times (4$ or $12n)+3 \times 12n/4$. The numbers of the PSFCH resources corresponding to "00", "01", "11", and "10" include but are not limited to the foregoing embodiment.

Embodiment 4

As shown in FIG. 3, in Embodiment 4 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that the sidelink communication in the resource pool is unicast.

In step S102, the user equipment receives sidelink control information (SCI) transmitted by other user equipment and a corresponding PSSCH.

Optionally, the user equipment determines a number $\text{Index}_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $\text{Index}_{startSubchannel}$.

Optionally, if the number of bits in HARQ feedback of the user equipment is 1, then optionally the user equipment determines that the number of a PSFCH resource for feeding back an HARQ ACK is $\text{Index}_{startSubchannel} \times (2 \text{ or } 12n) + i \times \text{PSFCHoccasion} \times 12n/N$; optionally, the user equipment determines that the number of a PSFCH resource for feeding back an HARQ NACK is $\text{Index}_{startSubchannel} \times (2 \text{ or } 12n) + i \times \text{PSFCHoccasion} \times 12n/N+1$; alternatively, optionally, the user equipment determines that the number of the PSFCH resource for feeding back the HARQ NACK is $\text{Index}_{startSubchannel} \times (2 \text{ or } 12n) + i \times \text{PSFCHoccasion} \times 12n/N + 12n/2$. Alternatively, optionally, the user equipment determines that the number of the PSFCH resource for feeding back the HARQ NACK is $\text{Index}_{startSubchannel} \times (2 \text{ or } 12n) + i \times \text{PSFCHoccasion} \times 12n/N$; optionally, the user equipment determines that the number of the PSFCH resource for feeding back the HARQ ACK is $\text{Index}_{startSubchannel} \times (2 \text{ or } 12n) + i \times \text{PSFCHoccasion} \times 12n/N+1$; alternatively, optionally, the user equipment determines that the number of the PSFCH resource for feeding back the HARQ ACK is $\text{Index}_{startSubchannel} \times (2 \text{ or } 12n) + i \times \text{PSFCHoccasion} \times 12n/N + 12n/2$.

Alternatively, optionally, if the number of bits in HARQ feedback of the user equipment is 2, then optionally the user equipment determines that the number of a PSFCH resource for feeding back "00" is $\text{Index}_{startSubchannel} \times (4 \text{ or } 12n) + i \times \text{PSFCHoccasion} \times 12n/N$; optionally, the user equipment determines that the number of a PSFCH resource for feeding back "01" is $\text{Index}_{startSubchannel} \times (4 \text{ or } 12n) + i \times \text{PSFCHoccasion} \times 12n/N+1$; alternatively, optionally, the user equipment determines that the number of the PSFCH resource for feeding back "01" is $\text{Index}_{startSubchannel} \times (4 \text{ or } 12n) + i \times \text{PSFCHoccasion} \times 12n/N + 12n/4$; optionally, the user equipment determines that the number of a PSFCH resource for feeding back "11" is $\text{Index}_{startSubchannel} \times (4 \text{ or } 12n) + i \times \text{PSFCHoccasion} \times 12n/N+2$; alternatively, optionally, the user equipment determines that the number of the PSFCH resource for feeding back "11" is $\text{Index}_{startSubchannel} (4 \text{ or } 12n) + i \text{ PSFCHoccasion } 12n/N + (12n/4) \times 2$; optionally, the user equipment determines that the number of a PSFCH resource for feeding back "10" is $\text{Index}_{startSubchannel} \times (4 \text{ or } 12n) + i \times \text{PSFCHoccasion} \times 12n/N+3$; alternatively, optionally, the user equipment determines that the number of the PSFCH resource for feeding back "10" is $\text{Index}_{startSubchannel} (4 \text{ or } 12n) + i \times \text{PSFCHoccasion} \times 12n/N + (12n/4) \times 3$. The numbers of the PSFCH resources corresponding to "00", "01", "11", and "10" include but are not limited to the foregoing embodiment.

Embodiment 5

As shown in FIG. 3, in Embodiment 5 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that receiving UE feeds back only an HARQ NACK.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are groupcast transmission. Implementation of the indication information includes but is not limited to the following:

Optionally, the SCI includes 2-bit indication field indication information or 1-bit indication field indication information, and indicates that the SCI and the corresponding PSSCH are groupcast transmission.

Optionally, the SCI includes an ID of the other user equipment and/or an ID of the user equipment and/or the transmitted session (or link) ID, and indicates that the SCI and the corresponding PSSCH are groupcast transmission.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N-1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ NACK is $Index_{startSubchannel}+i\times N_{subchannel}$ Alternatively, optionally, if the number of bits in HARQ feedback of the user equipment is 2, then optionally the user equipment determines that the number of a PSFCH resource for feeding back "00" is $Index_{startSubchannel}+i\times N_{subchannel}$; alternatively, optionally, the user equipment determines that the number of a PSFCH resource for feeding back "11" is $Index_{startSubchannel}+N_{subchannel}$.

Alternatively, optionally, the user equipment determines that the number of the PSFCH resource for feeding back the HARQ NACK is $Index_{startSubchannel}+12n+i\times N_{subchannel}\times 12n$.

Embodiment 6

As shown in FIG. 3, in Embodiment 6 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that receiving UE feeds back only an HARQ NACK.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are groupcast transmission. Implementation of the indication information includes but is not limited to the following:

Optionally, the SCI includes 2-bit indication field indication information or 1-bit indication field indication information, and indicates that the SCI and the corresponding PSSCH are groupcast transmission.

Optionally, the SCI includes an ID of the other user equipment and/or an ID of the user equipment and/or the transmitted session (or link) ID, and indicates that the SCI and the corresponding PSSCH are groupcast transmission.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ NACK is $Index_{startSubchannel}$+i×PSFCHoccasion×12n/N.

Alternatively, optionally, if the number of bits in HARQ feedback of the user equipment is 2, then optionally the user equipment determines that the number of a PSFCH resource for feeding back "00" is $Index_{startSubchannel}$+i×PSFCHoccasion×12n/N; alternatively, optionally, the user equipment determines that the number of a PSFCH resource for feeding back "11" is $Index_{startSubchannel}$i×PSFCHoccasion×12n/N.

Alternatively, optionally, the user equipment determines that the number of the PSFCH resource for feeding back the HARQ NACK is $Index_{startSubchannel}$×12n+i×PSFCHoccasion×12n/N.

Embodiment 7

As shown in FIG. 3, in Embodiment 7 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that sidelink communication in the resource pool is groupcast.

Optionally, the resource pool configuration information includes configuration information that receiving UE feeds back only an HARQ NACK.

In step S102, the user equipment receives sidelink control information (SCI) transmitted by other user equipment and a corresponding PSSCH.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ NACK is $Index_{startSubchannel}+i\times N_{subchannel}$.

Alternatively, optionally, if the number of bits in HARQ feedback of the user equipment is 2, then optionally the user equipment determines that the number of a PSFCH resource for feeding back "00" is $Index_{startSubchannel}+i\times N_{subchannel}$; alternatively, optionally, the user equipment determines that the number of a PSFCH resource for feeding back "11" is $Index_{startSubchannel}+i\times N_{subchannel}$.

Alternatively, optionally, the user equipment determines that the number of the PSFCH resource for feeding back the HARQ NACK is $Index_{startSubchannel}+12n+i\times N_{subchannel}\times 12n$.

Embodiment 8

As shown in FIG. 3, in Embodiment 8 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that sidelink communication in the resource pool is groupcast.

Optionally, the resource pool configuration information includes configuration information that receiving UE feeds back only an HARQ NACK.

In step S102, the user equipment receives sidelink control information (SCI) transmitted by other user equipment and a corresponding PSSCH.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$. Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines resources of the PSFCH or the resource numbers of the PSFCH according to i and/or the $Index_{startSubchannel}$.

Optionally, if the number of bits in HARQ feedback of the user equipment is 1, then optionally the user equipment determines that the number of a PSFCH resource for feeding back an HARQ NACK is $Index_{startSubchannel}$+i×PSFCHoccasion×12n/N.

Alternatively, optionally, if the number of bits in HARQ feedback of the user equipment is 2, then optionally the user equipment determines that the number of a PSFCH resource for feeding back "00" is $Index_{startSubchannel}$+i×PSFCHoccasion×12n/N; alternatively, optionally, the user equipment determines that the number of a PSFCH resource for feeding back "11" is $Index_{startSubchannel}$+i×PSFCHoccasion×12n/N.

Alternatively, optionally, the user equipment determines that the number of the PSFCH resource for feeding back the HARQ NACK is $Index_{startSubchannel}$×12n+i×PSFCHoccasion×12n/N.

Embodiment 9

As shown in FIG. 3, in Embodiment 9 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that receiving UE feeds back an HARQ ACK and an HARQ NACK.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are groupcast transmission. Implementation of the indication information includes but is not limited to the following:

Optionally, the SCI includes 2-bit indication field indication information or 1-bit indication field indication information, and indicates that the SCI and the corresponding PSSCH are groupcast transmission.

Optionally, the SCI includes an ID of the other user equipment and/or an ID of the user equipment and/or the transmitted session (or link) ID, and indicates that the SCI and the corresponding PSSCH are groupcast transmission.

Optionally, the user equipment determines a number $Index_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $slot_{PSSCH}$.

Optionally, the user equipment determines, according to the $slot_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol (the number of OFDM symbols is denoted as $N_{sym}$) in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines an intra-group identifier denoted as m. Optionally, the user equipment determines resources of the PSFCH or the resource numbers of the PSFCH according to i and/or m and/or the $Index_{startSubchannel}$.

Optionally, the user equipment determines a variable $$Capacity_{UE} = \frac{12 \times n \times PSFCHoccasion}{2^x \times N_{subchannel} \times N}.$$

Alternatively, optionally, the user equipment determines a variable $$Capacity_{UE} = \frac{12 \times SubchannelSize}{2^x \times N}.$$

Alternatively, optionally, the user equipment determines a variable $$Capacity_{UE} = \frac{12 \times n}{2^x}.$$

Alternatively, optionally, the user equipment determines a variable $$Capacity_{UE} = \frac{12 \times SubchannelSize}{2^x \times N} \times N_{sym}.$$

Alternatively, optionally, the variable $Capacity_{UE}$ is included in the sidelink configuration information, or is included in the pre-configuration information of the user equipment, or has a predefined value.

Optionally, if the number of bits in HARQ feedback of the user equipment is 1, then optionally, the user equipment determines that the number of a PSFCH resource for feeding back an HARQ ACK is $Index_{startSubchannel} \times Capacity_{UE} + m + i \times N_{subchannel} \times Capacity_{UE}$; optionally, the user equipment determines that the number of a PSFCH resource for feeding back an HARQ NACK is $Index_{startSubchannel} \times Capacity_{UE} + m + i \times N_{subchannel} \times Capacity_{UE} + 1$; alternatively, optionally, the user equipment determines that the number of the PSFCH resource for feeding back the HARQ NACK is $Index_{startSubchannel} \times Capacity_{UE} + m + i \times N_{subchannel} \times Capacity_{UE} + 12n/2$. Alternatively, optionally, the user equipment determines that the number of the PSFCH resource for feeding back the HARQ NACK is $Index_{startSubchannel} \times Capacity_{UE} + m + N_{subchannel} \times Capacity_{UE}$; optionally, the user equipment determines that the number of the PSFCH resource for feeding back the HARQ ACK is $Index_{startSubchannel} \times Capacity_{UE} + m + N_{subchannel} \times Capacity_{UE} + 1$; alternatively, optionally, the user equipment determines that the number of the PSFCH resource for feeding back the HARQ ACK is $Index_{startSubchannel} \times Capacity_{UE} + m + i \times N_{subchannel} \times Capacity_{UE} + 12n/2$.

Alternatively, optionally, if the number of bits in HARQ feedback of the user equipment is 2, then optionally, the user equipment determines that the number of a PSFCH resource for feeding back "00" is $Index_{startSubchannel} \times Capacity_{UE} + m + i \times N_{subchannel} \times Capacity_{UE}$; optionally, the user equipment determines that the number of a PSFCH resource for feeding back "01" is $Index_{startSubchannel} \times Capacity_{UE} + m + i \times N_{subchannel} \times Capacity_{UE} + 1$; alternatively, optionally, the user equipment determines that the number of the PSFCH resource for feeding back "01" is $Index_{startSubchannel} \times Capacity_{UE} + m + i \times N_{subchannel} \times Capacity_{UE} + 12n/4$; optionally, the user equipment determines that the number of a PSFCH resource for feeding back "11" is $Index_{startSubchannel} \times Capacity_{UE} + m + i \times N_{subchannel} \times Capacity_{UE} + 2$; alternatively, optionally, the user equipment determines that the number of the PSFCH resource for feeding back "11" is $Index_{startSubchannel} \times Capacity_{UE} + m + i \times N_{subchannel} \times Capacity_{UE} + 2 \times 12n/4$; optionally, the user equipment determines that the number of a PSFCH resource for feeding back "10" is $Index_{startSubchannel} \times Capacity_{UE} + m + i \times N_{subchannel} \times Capacity_{UE} + 3$; alternatively, optionally, the user equipment determines that the number of the PSFCH resource for feeding back "10" is $Index_{startSubchannel} \times Capacity_{UE} + m + i \times N_{subchannel} \times Capacity_{UE} + 3 \times 12n/4$. The numbers of the PSFCH resources corresponding to "00", "01", "11", and "10" include but are not limited to the foregoing embodiment.

Optionally, if the intra-group identifier m of the user equipment>$Capacity_{UE}$, then optionally, the user equipment does not feed back any HARQ information, or the user equipment assumes that the HARQ feedback is disabled.

Embodiment 10

As shown in FIG. 3, in Embodiment 10 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that receiving UE feeds back an HARQ ACK and an HARQ NACK.

In step S102, the user equipment receives sidelink control information (SCI) transmitted by other user equipment and a corresponding PSSCH.

Optionally, the SCI transmitted by the other user equipment includes indication information indicating that the SCI and the corresponding PSSCH are groupcast transmission. Implementation of the indication information includes but is not limited to the following:

Optionally, the SCI includes 2-bit indication field indication information or 1-bit indication field indication information, and indicates that the SCI and the corresponding PSSCH are groupcast transmission.

Optionally, the SCI includes an ID of the other user equipment and/or an ID of the user equipment and/or the transmitted session (or link) ID, and indicates that the SCI and the corresponding PSSCH are groupcast transmission.

Optionally, the user equipment determines a number $\text{Index}_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $\text{slot}_{PSSCH}$.

Optionally, the user equipment determines, according to the $\text{slot}_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $\text{slot}_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol (the number of OFDM symbols is denoted as $N_{sym}$) in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines an intra-group identifier denoted as m.

Optionally, the user equipment determines resources of the PSFCH or the resource numbers of the PSFCH according to i and/or m and/or the $\text{Index}_{startSubchannel}$.

Optionally, the user equipment determines a variable $$Capacity_{UE} = \frac{12 \times n \times PSFCHoccasion}{2^x \times N_{subchannel} \times N}.$$

Alternatively, optionally, the user equipment determines a variable $$Capacity_{UE} = \frac{12 \times SubchannelSize}{2^x \times N}.$$

Alternatively, optionally, the user equipment determines a variable $$Capacity_{UE} = \frac{12 \times n}{2^x}.$$

Alternatively, optionally, the user equipment determines a variable $$Capacity_{UE} = \frac{12 \times SubchannelSize}{2^x \times N} \times N_{sym}.$$

Alternatively, optionally, the variable $Capacity_{UE}$ is included in the sidelink configuration information, or is included in the pre-configuration information of the user equipment, or has a predefined value.

Optionally, if the number of bits in HARQ feedback of the user equipment is 1, then optionally, the user equipment determines that the number of a PSFCH resource for feeding back an HARQ ACK is $\text{Index}_{startSubchannel} \times Capacity_{UE}+m+i \times PSFCHoccasion \times 12n/N$; optionally, the user equipment determines that the number of a PSFCH resource for feeding back an HARQ NACK is $\text{Index}_{startSubchannel} \times Capacity_{UE}+m+i \times PSFCHoccasion \times 12n/N+1$; alternatively, optionally, the user equipment determines that the number of the PSFCH resource for feeding back the HARQ NACK is $\text{Index}_{startSubchannel} \times Capacity_{UE}+m+i \times PSFCHoccasion \times 12n/N+12n/2$. Alternatively, optionally, the user equipment determines that the number of the PSFCH resource for feeding back the HARQ NACK is $\text{Index}_{startSubchannel} \times Capacity_{UE}+m+i \times PSFCHoccasion \times 12n/N$; optionally, the user equipment determines that the number of the PSFCH resource for feeding back the HARQ ACK is $\text{Index}_{startSubchannel} \times Capacity_{UE}+m+i \times PSFCHoccasion \times 12n/N+1$; alternatively, optionally, the user equipment determines that the number of the PSFCH resource for feeding back the HARQ ACK is $\text{Index}_{startSubchannel} \times Capacity_{UE}+m+i \times PSFCHoccasion \times 12n/N+12n/2$.

Alternatively, optionally, if the number of bits in HARQ feedback of the user equipment is 2, then optionally, the user equipment determines that the number of a PSFCH resource for feeding back "00" is $\text{Index}_{startSubchannel} \times Capacity_{UE}+m+i \times PSFCHoccasion \times 12n/N$; optionally, the user equipment determines that the number of a PSFCH resource for feeding back "01" is $\text{Index}_{startSubchannel} \times Capacity_{UE}+m+i \times PSFCHoccasion \times 12n/N+1$; alternatively, optionally, the user equipment determines that the number of the PSFCH resource for feeding back "01" is $\text{Index}_{startSubchannel} \times Capacity_{UE}+m+i \times PSFCHoccasion \times 12n/N+12n/4$; optionally, the user equipment determines that the number of a PSFCH resource for feeding back "11" is $\text{Index}_{startSubchannel} \times \text{Capacity}_{UE} + m + i \times \text{PSFCHoccasion} \times 12n/N+2$; alternatively, optionally, the user equipment determines that the number of the PSFCH resource for feeding back "11" is $\text{Index}_{startSubchannel} \times \text{Capacity}_{UE} + m + i \times \text{PSFCHoccasion} \times 12n/N+2 \times 12n/4$; optionally, the user equipment determines that the number of a PSFCH resource for feeding back "10" is $\text{Index}_{startSubchannel} \times \text{Capacity}_{UE} + m + i \times \text{PSFCHoccasion} \times 12n/N+3$; alternatively, optionally, the user equipment determines that the number of the PSFCH resource for feeding back "10" is $\text{Index}_{startSubchannel} \times \text{Capacity}_{UE} + m + i \times \text{PSFCHoccasion} \times 12n/N+3 \times 12n/4$. The numbers of the PSFCH resources corresponding to "00", "01", "11", and "10" include but are not limited to the foregoing embodiment.

Optionally, if the intra-group identifier m of the user equipment>$\text{Capacity}_{UE}$, then optionally, the user equipment does not feed back any HARQ information, or the user equipment assumes that the HARQ feedback is disabled.

Example 11

As shown in FIG. 3, in Embodiment 11 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information $N_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that sidelink communication in the resource pool is groupcast.

Optionally, the resource pool configuration information includes configuration information that receiving UE feeds back an HARQ ACK and an HARQ NACK.

In step S102, the user equipment receives sidelink control information (SCI) transmitted by other user equipment and a corresponding PSSCH.

Optionally, the user equipment determines a number $\text{Index}_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as $\text{slot}_{PSSCH}$.

Optionally, the user equipment determines, according to the $\text{slot}_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $\text{slot}_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol (the number of OFDM symbols is denoted as $N_{sym}$) in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines an intra-group identifier denoted as m.

Optionally, the user equipment determines resources of the PSFCH or the resource numbers of the PSFCH according to i and/or m and/or the $\text{Index}_{startSubchannel}$.

Optionally, the user equipment determines a variable $$\text{Capacity}_{UE} = \frac{12 \times n \times PSFCHoccasion}{2^x \times N_{subchannel} \times N}.$$

Alternatively, optionally, the user equipment determines a variable $$\text{Capacity}_{UE} = \frac{12 \times SubchannelSize}{2^x \times N}.$$

Alternatively, optionally, the user equipment determines a variable $$\text{Capacity}_{UE} = \frac{12 \times n}{2^x}.$$

Alternatively, optionally, the user equipment determines a variable $$Capacity_{UE} = \frac{12 \times SubchannelSize}{2^x \times N} \times N_{sym}.$$

Alternatively, optionally, the variable Capacity$_{UE}$ is included in the sidelink configuration information, or is included in the pre-configuration information of the user equipment, or has a predefined value.

Optionally, if the number of bits in HARQ feedback of the user equipment is 1, then optionally, the user equipment determines that the number of a PSFCH resource for feeding back an HARQ ACK is Index$_{startSubchannel}$×Capacity$_{UE}$+m+i×N$_{subchannel}$×Capacity$_{UE}$; optionally, the user equipment determines that the number of a PSFCH resource for feeding back an HARQ NACK is Index$_{startSubchannel}$×Capacity$_{UE}$+m+i×N$_{subchannel}$×Capacity$_{UE}$+1; alternatively, optionally, the user equipment determines that the number of the PSFCH resource for feeding back the HARQ NACK is Index$_{startSubchannel}$×Capacity$_{UE}$+m+i×N$_{subchannel}$×Capacity$_{UE}$+12n/2. Alternatively, optionally, the user equipment determines that the number of the PSFCH resource for feeding back the HARQ NACK is Index$_{startSubchannel}$×Capacity$_{UE}$+m+N$_{subchannel}$×Capacity$_{UE}$; optionally, the user equipment determines that the number of the PSFCH resource for feeding back the HARQ ACK is Index$_{startSubchannel}$×Capacity$_{UE}$+m+N$_{subchannel}$×Capacity$_{UE}$+1; alternatively, optionally, the user equipment determines that the number of the PSFCH resource for feeding back the HARQ ACK is Index$_{startSubchannel}$×Capacity$_{UE}$+m+i×N$_{subchannel}$×Capacity$_{UE}$+12n/2.

Alternatively, optionally, if the number of bits in HARQ feedback of the user equipment is 2, then optionally, the user equipment determines that the number of a PSFCH resource for feeding back "00" is Index$_{startSubchannel}$×Capacity$_{UE}$+m+i×N$_{subchannel}$×Capacity$_{UE}$; optionally, the user equipment determines that the number of a PSFCH resource for feeding back "01" is Index$_{startSubchannel}$×Capacity$_{UE}$+m+i×N$_{subchannel}$×Capacity$_{UE}$+1; alternatively, optionally, the user equipment determines that the number of the PSFCH resource for feeding back "01" is Index$_{startSubchannel}$×Capacity$_{UE}$+m+i×N$_{subchannel}$×Capacity$_{UE}$+12n/4; optionally, the user equipment determines that the number of a PSFCH resource for feeding back "11" is Index$_{startSubchannel}$×Capacity$_{UE}$+m+i×N$_{subchannel}$×Capacity$_{UE}$+2; alternatively, optionally, the user equipment determines that the number of the PSFCH resource for feeding back "11" is Index$_{startSubchannel}$×Capacity$_{UE}$+m+i×N$_{subchannel}$×Capacity$_{UE}$+2×12n/4; optionally, the user equipment determines that the number of a PSFCH resource for feeding back "10" is Index$_{startSubchannel}$×Capacity$_{UE}$+m+i×N$_{subchannel}$×Capacity$_{UE}$+3; alternatively, optionally, the user equipment determines that the number of the PSFCH resource for feeding back "10" is Index$_{startSubchannel}$×Capacity$_{UE}$+m+i×N$_{subchannel}$×Capacity$_{UE}$+3×12n/4. The numbers of the PSFCH resources corresponding to "00", "01", "11", and "10" include but are not limited to the foregoing embodiment.

Optionally, if the intra-group identifier m of the user equipment>Capacity$_{UE}$, then optionally, the user equipment does not feed back any HARQ information, or the user equipment assumes that the HARQ feedback is disabled.

Embodiment 12

As shown in FIG. 3, in Embodiment 12 of the present disclosure, a method performed by user equipment may include:

In step S101, sidelink user equipment determines sidelink configuration information.

Optionally, the sidelink configuration information is configuration information transmitted by a base station through RRC signaling. Alternatively, optionally, the sidelink configuration information is included in pre-configuration information of the user equipment.

Optionally, the sidelink configuration information includes resource pool configuration information.

Optionally, the resource pool configuration information includes subchannel size information SubchannelSize. Optionally, the subchannel size information is in units of PRBs.

Optionally, the resource pool configuration information includes subchannel number information N$_{subchannel}$.

Optionally, the resource pool configuration information includes a PSFCH period N. Optionally, the PSFCH period is in units of slots in the resource pool.

Optionally, the resource pool configuration information includes an interval K from a PSSCH to a corresponding PSFCH. Optionally, K is in units of slots.

Optionally, the resource pool configuration information includes configuration information that sidelink communication in the resource pool is groupcast.

Optionally, the resource pool configuration information includes configuration information that receiving UE feeds back an HARQ ACK and an HARQ NACK.

In step S102, the user equipment receives sidelink control information (SCI) transmitted by other user equipment and a corresponding PSSCH.

Optionally, the user equipment determines a number Index$_{startSubchannel}$ of a starting subchannel of the PSSCH according to the SCI.

In step S103, the user equipment determines resources of the PSFCH corresponding to the PSSCH.

Optionally, the number of bits in HARQ feedback of the user equipment is x. Optionally, x=1 or 2 or a positive integer greater than 2.

Optionally, the PSFCH occupies n consecutive PRBs in the frequency domain. Optionally, n=1 or 2 or a positive integer greater than 2.

A slot in which the last OFDM symbol of the PSSCH is located is denoted as slot$_{PSSCH}$.

Optionally, the user equipment determines, according to the slot$_{PSSCH}$ and/or K and/or N and/or at least one piece of information other than N and K in the resource pool configuration information (optionally, configuration information of resource pool sidelink time domain resources), a slot s in which the PSFCH corresponding to the PSSCH is located. Optionally, in a specific implementation, an interval (in units of slots) between the slot s in which the PSFCH corresponding to the PSSCH is located and a slot in which the PSSCH is located is not less than K, the slot s is not less than the smallest positive integer in K, and the slot s includes a PSFCH resource having a configured period equal to N.

Optionally, the user equipment determines, according to the slot s and/or N and/or K and/or at least one piece of information other than N and K in the resource pool configuration information (optionally, the configuration information of the resource pool sidelink time domain resources), N consecutive slots corresponding to the slot s. Optionally, the PSFCH corresponding to the PSSCH received on the N consecutive slots is on the slot s in the time domain.

Optionally, the user equipment determines that the $slot_{PSSCH}$ is the (i+1)th slot of the N consecutive slots, where i=0, 1, . . . , N−1.

Optionally, the user equipment determines the number of PSFCH occasions on the slot s according to the resource pool configuration information, and the number is denoted as PSFCHoccasion.

Optionally, in the slot s, only one OFDM symbol in the time domain includes the PSFCH occasion, or, optionally, more than one OFDM symbol (the number of OFDM symbols is denoted as $N_{sym}$) in the time domain includes the PSFCH occasion.

Optionally, the user equipment determines respective numbers of PSFCH resources on the slot s, and the numbers include number 0 to number PSFCHoccasion*12n−1. Optionally, if a PSFCH resource number k+1 and a PSFCH resource number k belong to the same PSFCH occasion, then a cyclic shift corresponding to the PSFCH resource number k+1 equals a cyclic shift corresponding to the PSFCH resource number k plus 1. k is a non-negative integer.

Optionally, the user equipment determines an intra-group identifier denoted as m.

Optionally, the user equipment determines resources of the PSFCH or the resource numbers of the PSFCH according to i and/or m and/or the $Index_{startSubchannel}$.

Optionally, the user equipment determines a variable $$Capacity_{UE} = \frac{12 \times n \times PSFCHoccasion}{2^x \times N_{subchannel} \times N}.$$

Alternatively, optionally, the user equipment determines a variable $$Capacity_{UE} = \frac{12 \times SubchannelSize}{2^x \times N}.$$

Alternatively, optionally, the user equipment determines a variable $$Capacity_{UE} = \frac{12 \times n}{2^x}.$$

Alternatively, optionally, the user equipment determines a variable $$Capacity_{UE} = \frac{12 \times SubchannelSize}{2^x \times N} \times N_{sym}.$$

Alternatively, optionally, the variable $Capacity_{UE}$ is included in the sidelink configuration information, or is included in the pre-configuration information of the user equipment, or has a predefined value.

Optionally, if the number of bits in HARQ feedback of the user equipment is 1, then optionally, the user equipment determines that the number of a PSFCH resource for feeding back an HARQ ACK is $Index_{startSubchannel} \times Capacity_{UE} + m + i \times PSFCHoccasion \times 12n/N$; optionally, the user equipment determines that the number of a PSFCH resource for feeding back an HARQ NACK is $Index_{startSubchannel} \times Capacity_{UE} + m + i \times PSFCHoccasion \times 12n/N + 1$; alternatively, optionally, the user equipment determines that the number of the PSFCH resource for feeding back the HARQ NACK is $Index_{startSubchannel} \times Capacity_{UE} + m + i \times PSFCHoccasion \times 12n/N + 12n/2$. Alternatively, optionally, the user equipment determines that the number of the PSFCH resource for feeding back the HARQ NACK is $Index_{startSubchannel} \times Capacity_{UE} + m + i \times PSFCHoccasion \times 12n/N$; optionally, the user equipment determines that the number of the PSFCH resource for feeding back the HARQ ACK is $Index_{startSubchannel} \times Capacity_{UE} + m + i \times PSFCHoccasion \times 12n/N + 1$; alternatively, optionally, the user equipment determines that the number of the PSFCH resource for feeding back the HARQ ACK is $Index_{startSubchannel} \times Capacity_{UE} + m + i \times PSFCHoccasion \times 12n/N + 12n/2$.

Alternatively, optionally, if the number of bits in HARQ feedback of the user equipment is 2, then optionally, the user equipment determines that the number of a PSFCH resource for feeding back "00" is $Index_{startSubchannel} \times Capacity_{UE} + m + i \times PSFCHoccasion \times 12n/N$; optionally, the user equipment determines that the number of a PSFCH resource for feeding back "01" is $Index_{startSubchannel} \times Capacity_{UE} + m + i \times PSFCHoccasion \times 12n/N + 1$; alternatively, optionally, the user equipment determines that the number of the PSFCH resource for feeding back "01" is $Index_{startSubchannel} \times Capacity_{UE} + m + i \times PSFCHoccasion \times 12n/N + 12n/4$; optionally, the user equipment determines that the number of a PSFCH resource for feeding back "11" is $Index_{startSubchannel} \times Capacity_{UE} + m + i \times PSFCHoccasion \times 12n/N + 2$; alternatively, optionally, the user equipment determines that the number of the PSFCH resource for feeding back "11" is $Index_{startSubchannel} \times Capacity_{UE} + m + i \times PSFCHoccasion \times 12n/N + 2 \times 12n/4$; optionally, the user equipment determines that the number of a PSFCH resource for feeding back "10" is $Index_{startSubchannel} \times Capacity_{UE} + m + i \times PSFCHoccasion \times 12n/N + 3$; alternatively, optionally, the user equipment determines that the number of the PSFCH resource for feeding back "10" is $Index_{startSubchannel} \times Capacity_{UE} + m + i \times PSFCHoccasion \times 12n/N + 3 \times 12n/4$. The numbers of the PSFCH resources corresponding to "00", "01", "11", and "10" include but are not limited to the foregoing embodiment.

Optionally, if the intra-group identifier m of the user equipment>$Capacity_{UE}$, then optionally, the user equipment does not feed back any HARQ information, or the user equipment assumes that the HARQ feedback is disabled.

Figure 4:
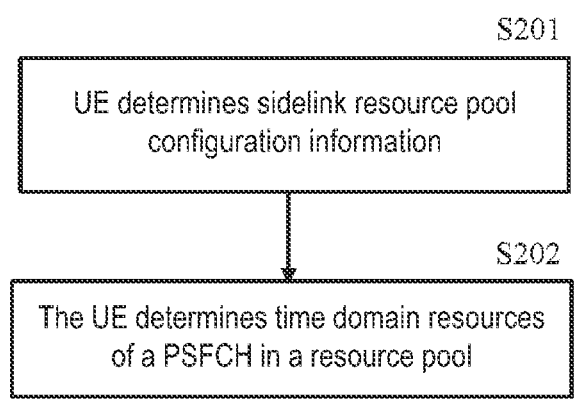
FIG. 4 is a basic flowchart schematically showing a method performed by user equipment according to Embodiment 13 and Embodiment 14 of the present disclosure.

FIG. 4 is a basic flowchart showing a method performed by user equipment according to Embodiment 13 and Embodiment 14 of the present disclosure.

The method performed by user equipment according to Embodiment 13 and Embodiment 14 of the present disclosure is described in detail below in conjunction with the basic flowchart shown in FIG. 4.

Embodiment 13

As shown in FIG. 4, in Embodiment 13 of the present invention, a method performed by user equipment includes:

In step S201, sidelink user equipment determines sidelink resource pool configuration information.

Optionally, the sidelink resource pool configuration information is configuration information transmitted by a base station through RRC signaling.

Alternatively, optionally, the sidelink resource pool configuration information is included in pre-configuration information of the user equipment.

Optionally, the sidelink resource pool configuration information includes PSFCH configuration information.

Optionally, the PSFCH configuration information indicates a starting OFDM symbol $s_{start}$ of a PSFCH resource or the OFDM symbol number $n_{ofdm}$ of the PSFCH resource.

In step S202, the user equipment determines time domain resources of a PSFCH in a resource pool.

Optionally, if the PSFCH configuration information indicates the starting OFDM symbol $s_{start}$ of the PSFCH resource, then the UE determines that the time domain resources of the PSFCH are from the OFDM symbol $s_{start}$ to an OFDM symbol $N_{symbol}^{slot}-1$, or the UE determines that the time domain resources of the PSFCH are from the OFDM symbol $s_{start}$ to an OFDM symbol $N_{symbol}^{slot}-2$.

Alternatively, optionally, if the PSFCH configuration information indicates the OFDM symbol number $n_{ofdm}$ of the PSFCH resource, then the UE determines that the time domain resources of the PSFCH are from an OFDM symbol $N_{symbol}^{slot}-n_{ofdm}$ to an OFDM symbol $N_{symbol}^{slot}-1$, or the UE determines that the time domain resources of the PSFCH are from an OFDM symbol $N_{symbol}^{slot}-n_{ofdm}-1$ to an OFDM symbol $N_{symbol}^{slot}-2$.

Embodiment 14

As shown in FIG. 4, in Embodiment 14 of the present invention, a method performed by user equipment includes:

In step S201, sidelink user equipment determines sidelink resource pool configuration information.

Optionally, the sidelink resource pool configuration information is configuration information transmitted by a base station through RRC signaling.

Alternatively, optionally, the sidelink resource pool configuration information is included in pre-configuration information of the user equipment.

Optionally, the sidelink resource pool configuration information includes PSFCH configuration information.

Optionally, the PSFCH configuration information includes configuration information of at least one PSFCH format.

Optionally, the at least one PSFCH format includes a first PSFCH format, and the first PSFCH format occupies 1 OFDM symbol in the time domain.

Optionally, the at least one PSFCH format includes a second PSFCH format, and the second PSFCH format occupies p OFDM symbols in the time domain, where p is a positive integer greater than or equal to 1.

Optionally, configuration information of the first PSFCH format indicates a starting OFDM symbol $s_{start1}$ of the first PSFCH format resource or the OFDM symbol number $n_{ofdm1}$ of a PSFCH resource.

Optionally, configuration information of the second PSFCH format indicates a starting OFDM symbol $s_{start2}$ of the second PSFCH format resource or the OFDM symbol number $n_{ofdm2}$ of the PSFCH resource.

In step S202, the user equipment determines time domain resources of a PSFCH in a resource pool.

Optionally, if the PSFCH configuration information indicates the starting OFDM symbol $s_{start2}$ of the first PSFCH format resource and the starting OFDM symbol $s_{start2}$ of the second PSFCH format resource, then the UE determines that time domain resources of the first PSFCH format are from the OFDM symbol $s_{start1}$ to an OFDM symbol $s_{start2}-1$, and the UE determines that time domain resources of the second PSFCH format are from the OFDM symbol $s_{start2}$ to an OFDM symbol $N_{symbol}^{slot}-1$; alternatively, the UE determines that the time domain resources of the first PSFCH format are from the OFDM symbol $s_{start1}$ to the OFDM symbol $s_{start2}-1$, and the UE determines that the time domain resources of the second PSFCH format are from the OFDM symbol $s_{start2}$ to an OFDM symbol $N_{symbol}^{slot}-2$; alternatively, the UE determines that the time domain resources of the second PSFCH format are from the OFDM symbol $s_{start2}$ to an OFDM symbol $s_{start1}-1$, and the UE determines that the time domain resources of the first PSFCH format are from the OFDM symbol $s_{start1}$ to the OFDM symbol $N_{symbol}^{slot}-1$; alternatively, the UE determines that the time domain resources of the second PSFCH format are from the OFDM symbol $s_{start2}$ to the OFDM symbol $s_{start1}-1$, and the UE determines that the time domain resources of the first PSFCH format are from the OFDM symbol $s_{start1}$ to the OFDM symbol $N_{symbol}^{slot}-2$.

Alternatively, optionally, if the PSFCH configuration information indicates the OFDM symbol number $n_{ofdm1}$ of the first PSFCH format resource and the OFDM symbol number $n_{ofdm2}$ of the second PSFCH format resource, then the UE determines that time domain resources of the first PSFCH are from an OFDM symbol $N_{symbol}^{slot}-n_{ofdm1}-n_{ofdm2}$ to an OFDM symbol $N_{symbol}^{slot}-n_{ofdm2}-1$, and the UE determines that time domain resources of the second PSFCH are from an OFDM symbol $N_{symbol}^{slot}-n_{ofdm2}$ to an OFDM symbol $N_{symbol}^{slot}-1$; alternatively, the UE determines that the time domain resources of the first PSFCH are from an OFDM symbol $N_{symbol}^{slot}-n_{ofdm1}-n_{ofdm2}-1$ to an OFDM symbol $N_{symbol}^{slot}-n_{ofdm2}-2$, and the UE determines that the time domain resources of the second PSFCH are from the OFDM symbol $N_{symbol}^{slot}-n_{ofdm2}-1$ to an OFDM symbol $N_{symbol}^{slot}-2$; alternatively, the UE determines that the time domain resources of the second PSFCH are from the OFDM symbol $N_{symbol}^{slot}-n_{ofdm1}-n_{ofdm2}$ to an OFDM symbol $N_{symbol}^{slot}-n_{ofdm1}-1$, and the UE determines that the time domain resources of the first PSFCH are from an OFDM symbol $N_{symbol}^{slot}-n_{ofdm1}$ to the OFDM symbol $N_{symbol}^{slot}-1$; alternatively, the UE determines that the time domain resources of the second PSFCH are from the OFDM symbol $N_{symbol}^{slot}-n_{ofdm1}-n_{ofdm2}-1$ to an OFDM symbol $N_{symbol}^{slot}-n_{ofdm1}-2$, and the UE determines that the time domain resources of the first PSFCH are from the OFDM symbol $N_{symbol}^{slot}-n_{ofdm1}-1$ to the OFDM symbol $N_{symbol}^{slot}-2$.

Figure 5:
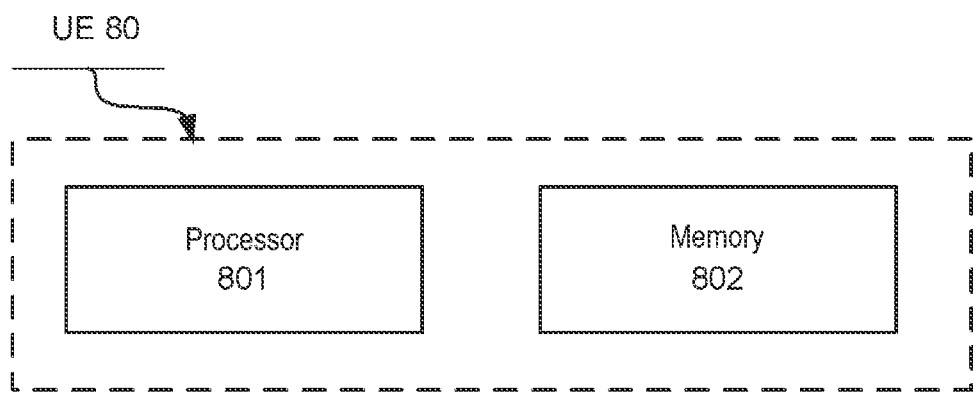
FIG. 5 is a block diagram schematically showing user equipment according to the present disclosure.

FIG. 5 is a block diagram showing user equipment (UE) related to the present disclosure. As shown in FIG. 5, the user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the above method performed by user equipment described in detail in the present disclosure.

The methods and related devices according to the present disclosure have been described above in conjunction with preferred embodiments. It should be understood by those skilled in the art that the methods shown above are only exemplary, and the above-described embodiments can be combined with one another as long as no contradiction arises. The method according to the present disclosure is not limited to steps or sequences shown above. The network node and the user equipment illustrated above may include more modules; for example, they may further include modules which can be developed or developed in the future to be applied to modules of a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

It should be understood that the above embodiments of the present disclosure may be implemented through software, hardware, or a combination of software and hardware. For example, various components inside the base station and user equipment in the above embodiments can be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present disclosure disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present disclosure. When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The invention claimed is:

1. A method performed by a user equipment, comprising:
    receiving a sidelink Radio Resource Control (RRC) configuration transmitted from a New Radio base station (gNB), wherein the sidelink RRC configuration includes a resource pool configuration, wherein the resource pool configuration includes a configuration of a Physical Sidelink Feedback Channel (PSFCH) periodicity N;
    receiving Sidelink Control Information (SCI) and a Physical Sidelink Shared Channel (PSSCH) scheduled by the SCI in a slot; and
    determining Physical Resource Blocks (PRBs) for a PSFCH that is for a feedback sidelink Hybrid Automatic Repeat Request (HARQ) and that corresponds to the PSSCH based on at least i, wherein the slot for the PSSCH is an (i+1)th slot among slots associated with a PSFCH slot for the PSFCH, where i=0, 1, ..., N−1.

2. A user equipment, comprising:
    a processor;
    memory;
    reception circuitry configured to:
        receive a sidelink Radio Resource Control (RRC) configuration transmitted from a New Radio base station (gNB), wherein the sidelink RRC configuration includes a resource pool configuration, wherein the resource pool configuration includes a configuration of a Physical Sidelink Feedback Channel (PSFCH) periodicity N, and
        receive Sidelink Control Information (SCI) and a Physical Sidelink Shared Channel (PSSCH) scheduled by the SCI in a slot; and
    determination circuitry configured to determine Physical Resource Blocks (PRBs) for a PSFCH that is for a feedback sidelink Hybrid Automatic Repeat Request (HARQ) and that corresponds to the PSSCH based on at least i, wherein the slot for the PSSCH is an (i+1)th slot among slots associated with a PSFCH slot for the PSFCH, where i=0, 1, ..., N−1.

3. A base station apparatus comprising:
    a processor;
    memory; and
    transmission circuitry configured to:
        transmit a sidelink Radio Resource Control (RRC) configuration to a user equipment, wherein the sidelink RRC configuration includes a resource pool configuration, wherein the resource pool configuration includes a configuration of a Physical Sidelink Feedback Channel (PSFCH) periodicity N,
the sidelink RRC configuration being transmitted so as to cause the user equipment to:
receive Sidelink Control Information (SCI) and a Physical Sidelink Shared Channel (PSSCH) scheduled by the SCI in a slot, and
determine Physical Resource Blocks (PRBs) for a PSFCH that is for a feedback sidelink Hybrid Automatic Repeat Request (HARQ) and that corresponds to the PSSCH based on at least i, wherein the slot for the PSSCH is an (i+1)th slot among slots associated with a PSFCH slot for the PSFCH, where i=0, 1, . . . , N−1.

* * * * *